(12) United States Patent
Kocian et al.

(10) Patent No.: US 6,401,546 B1
(45) Date of Patent: Jun. 11, 2002

(54) PRESS-FIT REMOTE DIAPHRAGM ASSEMBLY

(75) Inventors: Ronald D. Kocian, Brenham; Olaiz A. Saenz, Houston; Jon R. Schroeder, Brenham, all of TX (US)

(73) Assignee: P I Components Corporation, Brenham, TX (US)

( * ) Notice: Subject to any disclaimer, the term of this patent is extended or adjusted under 35 U.S.C. 154(b) by 0 days.

(21) Appl. No.: 09/504,990

(22) Filed: Feb. 15, 2000

(51) Int. Cl.[7] ................................................. G01L 7/00
(52) U.S. Cl. ....................................................... 73/756
(58) Field of Search .......................... 73/715, 756, 706, 73/700, 716–727

(56) References Cited

U.S. PATENT DOCUMENTS

| | | | |
|---|---|---|---|
| 3,633,605 A | 1/1972 | Smith | 137/113 |
| 4,626,636 A | 12/1986 | Hickman et al. | 200/83 |
| 4,745,810 A | 5/1988 | Pierce et al. | 73/706 |
| 5,328,005 A | 7/1994 | Van Breemen | 188/322.21 |
| 6,131,468 A | * 10/2000 | Sich et al. | 73/756 |

FOREIGN PATENT DOCUMENTS

EP       0 498 206 A1     8/1992

* cited by examiner

*Primary Examiner*—William Oen
*Assistant Examiner*—Andre Allen
(74) *Attorney, Agent, or Firm*—Judson K. Champlin; Westman, Champlin & Kelly (57) ABSTRACT

A remote diaphragm assembly, for use in the process control industry, is disclosed which can be quickly assembled and disassembled by press-fitting a diaphragm housing and an adapter housing together. The diaphragm housing includes a flexible diaphragm and a first retention ring receiving portion. The adapter housing is configured to place the flexible diaphragm in fluid communication with a process fluid in a vessel and includes a second retention ring receiving portion. The first and second retention ring receiving portions align to form a retention ring cavity. A retention ring is positioned within the retention ring cavity such that portions of the retention ring occupy the first and second retention ring receiving portions to couple the diaphragm housing to the adapter housing. Also disclosed is a method for assembling the above-described remote diaphragm assembly. The method includes securing a retention ring to either the first or the second retention ring receiving portions and press fitting the diaphragm housing and the adapter housing together to couple the diaphragm housing to the adapter housing.

13 Claims, 6 Drawing Sheets

PRESS-FIT REMOTE DIAPHRAGM ASSEMBLY

BACKGROUND OF THE INVENTION

The present invention relates to the process control industry. More particularly, the present invention relates to a remote diaphragm assembly or seal, of the type used to couple a process control instrument to a process.

Some types of process control instruments, such as pressure transmitters, have a diaphragm seal which is fluidically coupled to a remote diaphragm assembly by a fill fluid. The remote diaphragm assembly includes a flexible diaphragm that isolates the diaphragm seal of the pressure transmitter from corrosive process fluids contained in a vessel and allows the pressure transmitter to couple to the pressure of the vessel. The fill fluid is substantially incompressible and completely fills the cavities between the flexible diaphragm and the diaphragm seal including a capillary tube (or a thru hole if the remote diaphragm assembly is directly mounted to the process control instrument). The capillary tube is typically flexible and may extend for several meters to safely separate the transmitter from the process. Pressure exerted by the process fluid on the diaphragm is transferred through the fill fluid from the flexible diaphragm to the diaphragm seal of the transmitter which relays the pressure to a sensor contained within the transmitter.

The remote diaphragm assembly often includes a diaphragm housing and an adapter housing. The adapter housing is used to interface with a process flange which is attached to the vessel and provides access to the process fluid contained therein. The diaphragm housing mates to the adapter housing and includes a thin flexible diaphragm which, on one side is placed in fluid communication with the process fluid and, on the other side, is placed in fluid communication with the fill fluid. The remote diaphragm assembly may also include a gasket sandwiched between the diaphragm housing and the adapter housing to provide leakage protection. Another gasket is generally positioned between the adapter housing and the process flange to provide leakage protection at that junction.

To reduce the number of separate components that must be installed, the diaphragm housing, the adapter housing, and the gasket sandwiched therebetween, are sometimes assembled to form a single component. Current methods for assembling the remote diaphragm assembly include the use of screws, clips, nuts and bolts, and other similar fastening devices. These kinds of fasteners can lead to increased manufacturing costs due to the increased complexity of the remote diaphragm assembly and the numerous components. Additionally, these methods for assembling the remote diaphragm assembly require the use of tools resulting in a time-consuming assembly process. As a result, shipping costs can be high because diaphragm assemblies utilizing these types of fasteners are typically shipped disassembled and require larger packaging. Further costs are realized when the gasket of the remote diaphragm assembly requires replacement or inspection, due to a time-consuming disassembly process. As a result, there exists a need for a remote diaphragm assembly that can be easily assembled and disassembled by hand.

SUMMARY OF THE INVENTION

A remote diaphragm assembly, for use in the process control industry, is disclosed which can be quickly assembled and disassembled by hand by press-fitting a diaphragm housing and an adapter housing together. The diaphragm housing includes a flexible diaphragm and a first retention ring receiving portion. The adapter housing is configured to place the flexible diaphragm in fluid communication with a process fluid in a vessel and includes a second retention ring receiving portion. The first and second retention ring receiving portions align to form a retention ring cavity. A retention ring is positioned within the retention ring cavity such that portions of the retention ring occupy the first and second retention ring receiving portions to couple the diaphragm housing to the adapter housing. Also disclosed is a method for assembling the above-described remote diaphragm assembly. The method includes securing a retention ring to either the first or the second retention ring receiving portions and press fitting the diaphragm housing and the adapter housing together to couple the diaphragm housing to the adapter housing.

DETAILED DESCRIPTION OF THE PREFERRED EMBODIMENTS

The present invention includes a remote diaphragm assembly which can be assembled and disassembled with minimal effort. One embodiment of the remote diaphragm assembly generally includes a diaphragm housing, an adapter housing, and a retention ring. As will be described in greater detail below, the remote diaphragm assembly is assembled using a press-fit connection between the diaphragm housing and the adapter housing using the retention ring. This press-fit connection can be performed by hand and without the use of additional tools. Once press-fit together, the diaphragm housing and the adapter housing can remain connected during normal handling and installation of the remote diaphragm assembly without separating. Additionally, the press-fit connection resists the rotation of the diaphragm housing and the adapter housing relative to one another. As a result, once aligned by an installer, the diaphragm housing and the adapter housing will resist further rotation relative to each other. This feature is a significant improvement over prior art remote diaphragm assemblies which require the use of screws, nuts and bolts, clips, and other similar fasteners to assemble the remote diaphragm assembly. Furthermore, prior art remote diaphragm assemblies do not allow the diaphragm housing and the adapter housing to be rotated relative to each other once the remote diaphragm assembly is assembled.

Figure 1:
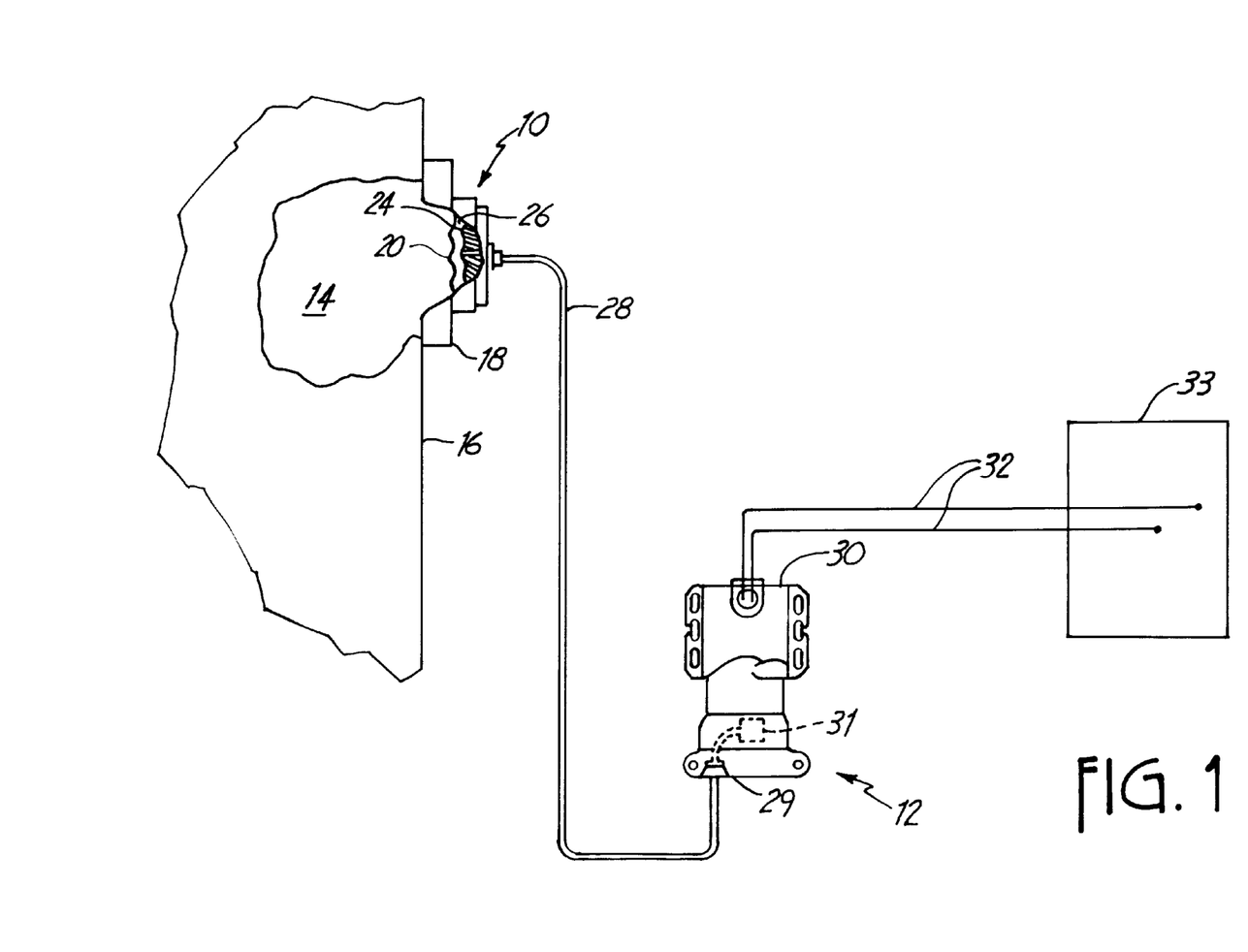
FIG. 1 is a simplified diagram showing a transmitter coupled to a remote diaphragm assembly in accordance with the present invention.

Referring now to FIG. 1, remote diaphragm assembly, generally designated as 10, can be used with process instrument 12, depicted as a pressure transmitter, to communicate a pressure of process medium 14 contained in process vessel 16. Process medium 14 could, for example, be a corrosive or an extremely hot process fluid, such that process instrument 12 is unable to contact, or operate in close proximity to, process medium 14. Diaphragm assembly 10 typically attaches to process flange 18 of vessel 16. Process flange 18 can be, for example, a standard ANSI flange, and provides fluid communication between thin flexible diaphragm 20 and process medium 14. Diaphragm 20 and backplate 24 define cavity 26. Capillary tube 28 fluidically couples cavity 26 to transmitter diaphragm 29 in transmitter housing 30. Cavity 26 and capillary tube 28 are filled with a suitable fill fluid for transmitting a pressure sensed by diaphragm 20 to transmitter diaphragm 29. The fill fluid may include silicone, oil, glycerin and water, propylene glycol and water, or any other suitable fluid which preferably is substantially incompressible.

The pressure received at transmitter diaphragm 29 is communicated to pressure sensor 31 contained in transmitter housing 30. Diaphragm 20 flexes in response to the pressure of process medium 14. Due to the fill fluid connecting diaphragm 20 to transmitter diaphragm 29, a corresponding flex occurs at transmitter diaphragm 29 which can be sensed by sensor 31 and used to determine the pressure within vessel 16. Sensor 31 can be a capacitance-based pressure cell, in which the capacitance of sensor 31 changes as a function of the pressure of process medium 14. Sensor 31 can also operate on other known sensing principles such as strain gauge technology. Sensor 31 produces a pressure signal, based upon the flex of transmitter diaphragm 29, that is indicative of the pressure of process medium 14. Circuitry within transmitter housing 30, such as that used by the 3051 Pressure Transmitter manufactured by Rosemount, Inc. of Eden Prairie, Minn., electronically converts the pressure signal into a linear 4–20 mA transmitter output signal which can be sent over wire pair 32 to process control circuitry 33.

Figure 2:
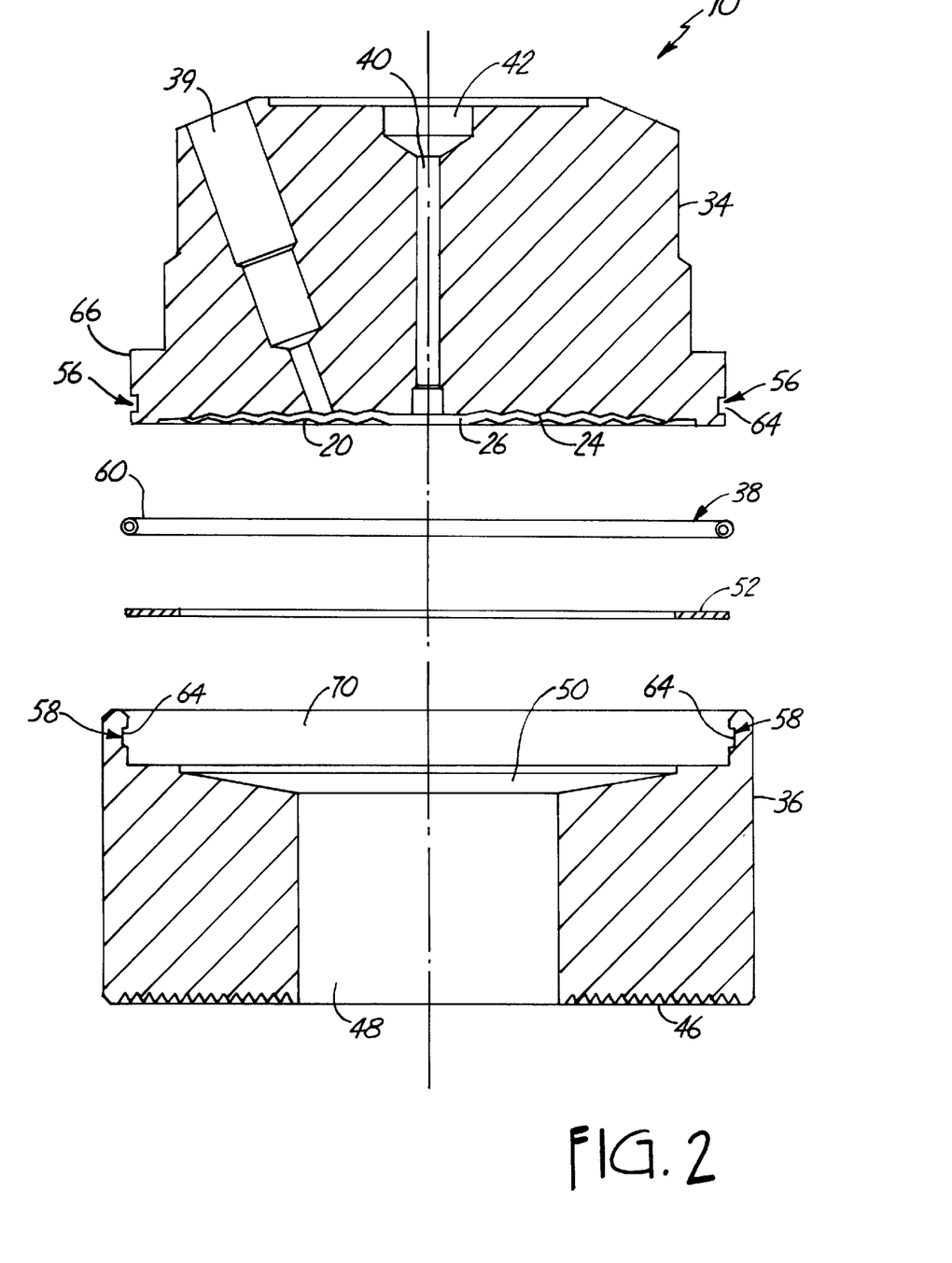
FIG. 2 is an exploded side cross-sectional view of a remote diaphragm assembly in accordance with one embodiment of the invention.
Figure 3:
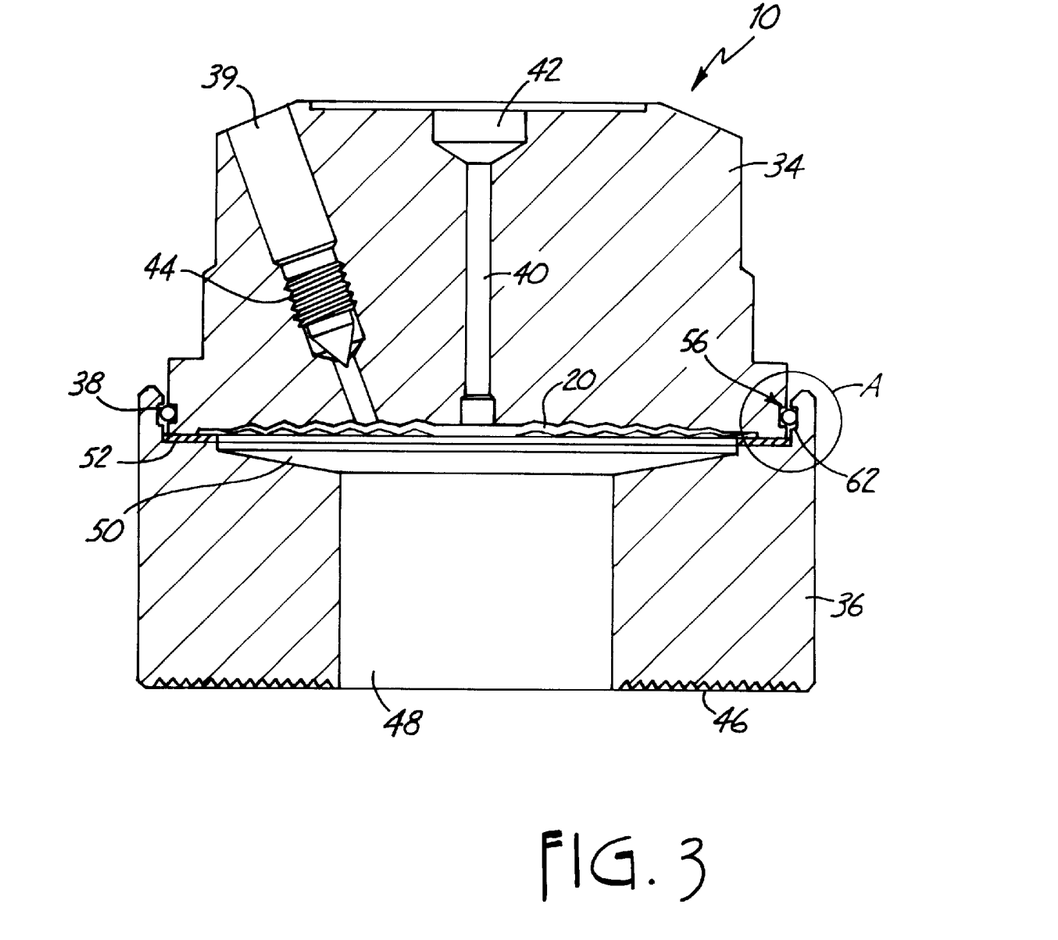
FIG. 3 is a side cross-sectional view of an assembled remote diaphragm assembly in accordance with one embodiment of the invention.

Referring now to FIGS. 2 and 3, a more detailed discussion of the various embodiments of the invention will be discussed. FIG. 2 is an exploded side cross-sectional view of remote diaphragm assembly 10 in accordance with one embodiment of the invention. FIG. 3 is a side cross-sectional view of an assembled remote diaphragm assembly 10. As mentioned above, remote diaphragm assembly 10 generally includes diaphragm housing 34, adapter housing 36, and retention ring 38. Diaphragm housing 34 and adapter housing 36 are preferably formed from a corrosion-resistant material, such as stainless steel. One embodiment of diaphragm housing 34 includes fluid fill port 39, fluid passageway 40, and tube port 42. Fill fluid can be introduced to cavity 26 through fluid fill port 39. A suitable plug 44 (shown in FIG. 3) can be used to prevent fill fluid from escaping port 39.

One embodiment of adapter housing 36 includes process flange interface 46, fluid passageway 48, and diaphragm interface 50. Flange interface 46 is generally configured to interface with process flange 18 (FIG. 1) and to provide fluid communication between flange 18 and fluid passageway 48. Fluid passageway 48 places diaphragm 20 in fluid communication with process fluid 14. Diaphragm interface 50 includes an opening that is sized to allow flexible diaphragm 20 to freely flex without contacting adapter housing 36. One embodiment of remote diaphragm assembly 10 includes gasket 52 to provide leakage protection between diaphragm housing 34 and adapter housing 36.

Figure 4:
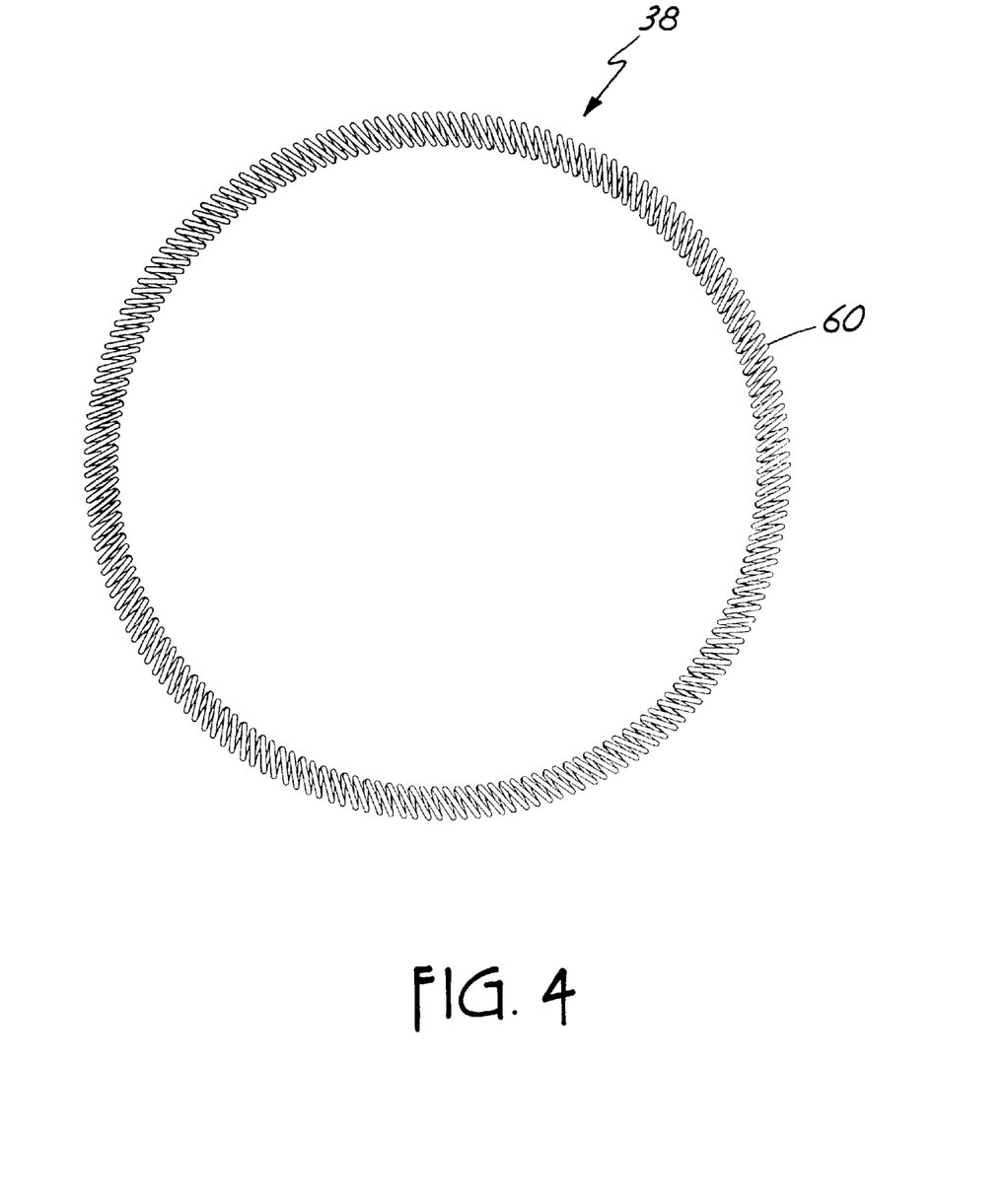
FIG. 4 is a top plan view of a retention ring in accordance with one embodiment of the invention.

Retention ring 38 is used to create a press-fit connection between diaphragm housing 34 and adapter housing 36. Retention ring 38 is preferably annularly shaped and is formed of a compressible material. One embodiment of retention ring 38, shown in FIG. 4, is a radial spring, which can be formed by connecting the ends of a conventional spring together. In another embodiment, retention ring 38 is a solid or hollow O-ring formed of an elastomeric material. This embodiment of retention ring 38 can provide additional leakage protection for remote diaphragm housing assembly 10. Retention ring 38 is shown as having a circular cross-section, however, other shapes, such as oval, octagonal, square, triangular, etc., are possible as well.

Diaphragm housing 34 and adapter housing 36 include first and second retention ring receiving portions 56, 58, respectively. First and second retention ring receiving portions 56, 58 are each generally configured to receive a portion of retention ring 38 and to engage exterior surface 60 of retention ring 38 for press-fit assembly of remote diaphragm assembly 10. First and second retention ring receiving portions 56, 58, form a retention ring cavity 62 when aligned, as shown in FIG. 3. Retention ring 38 is adapted to occupy retention ring cavity 62 to form the press-fit connection between diaphragm housing 34 and adapter housing 36. One embodiment of first and second retention ring receiving portions 56, 58 include annular grooves 64. Annular grooves 64 can be formed using conventional machining techniques.

Figure 5:
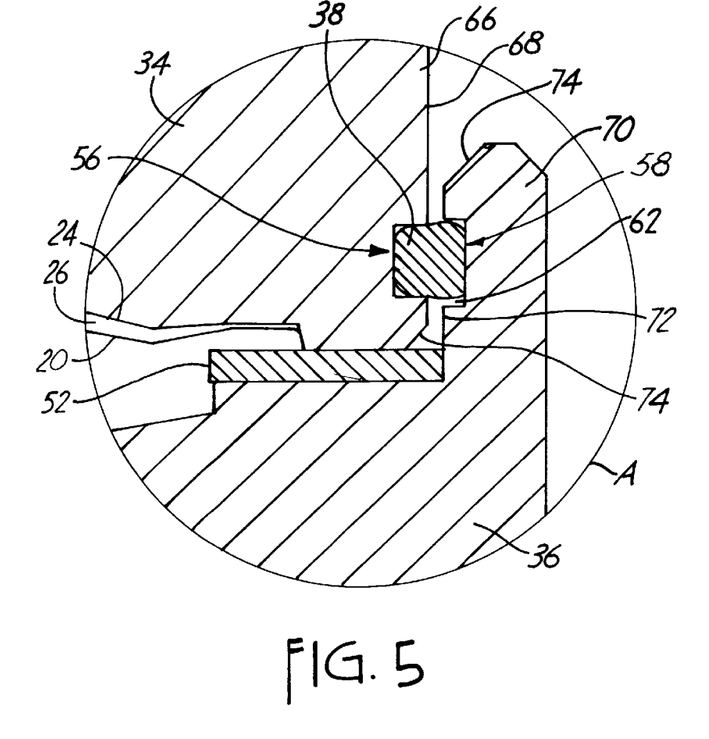
FIGS. 5 and 6 are magnified views of a portion of a portion of remote diaphragm assembly depicted in circle A of FIG. 5.

FIG. 5 is a magnified view of a portion of FIG. 3 that is contained within circle A and shows one embodiment of first and second retention ring receiving portions 56, 58. Here, diaphragm housing 34 includes first cylindrical portion 66 having exterior surface 68 which defines first retention ring receiving portion 56. Adapter housing 36 includes a second cylindrical portion 70 having an interior surface 72 which defines second retention ring receiving portion 58. Second cylindrical portion 70 has an inner diameter that is slightly larger than the outer diameter of first cylindrical portion 66. As a result, second cylindrical portion 70 can receive first cylindrical portion 66 for alignment of first and second retention ring receiving portions 56, 58 to form retention ring cavity 62.

Figure 6:
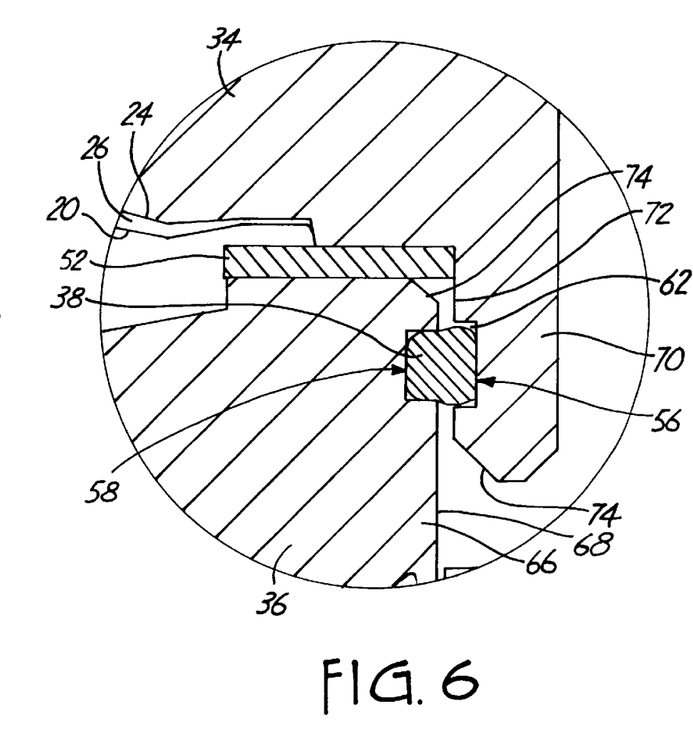

FIG. 6 illustrates another embodiment of the portion of remote diaphragm assembly 10 depicted in FIG. 5. In this embodiment, first retention ring receiving portion 56 of diaphragm housing 34 includes second cylindrical portion 70, and second retention ring receiving portion 58 of adapter housing 36 includes first cylindrical portion 66. Thus, for this embodiment, diaphragm housing 34 is configured to receive adapter housing 36.

One embodiment of first and second cylindrical portions 66, 70 include guide surfaces 74, shown in FIGS. 5 and 6. Guide surfaces 74 aide in the assembly of remote diaphragm assembly 10 by assisting or encouraging the insertion of first cylindrical portion 66 into second cylindrical portion 70. One embodiment of guide surface 74 is annularly shaped and angled to assist in the axial alignment of diaphragm housing 34 and adapter housing 36. Embodiments of the present invention include configurations where one or both diaphragm housing 34 and adapter housing 36 include guide surfaces 74.

Prior to press-fit assembling remote diaphragm assembly 10, a portion of retention ring 38 is secured to either first or second retention ring receiving portion 56, 58. In one embodiment, retention ring 38 is adapted to stretch around exterior surface 68 of first cylindrical portion 66, such that a portion of retention ring 38 securely rests within the corresponding first or second retention ring receiving portion 56, 58. Alternatively, retention ring 38 could be configured to exert a radially directed force against interior surface 72 of second cylindrical portion 70 such that it becomes secured within the corresponding first or second retention ring receiving portion 56.

In yet another alternative embodiment, retention ring 38 could be sized to fit snuggly within at least one of the first and second retention ring receiving portions 56, 58 or groove 64, such that it is held in place. For this embodiment, retention ring 38 could take the form of retention ring portions (not shown) which are displaced from each other and secured to one of the first and second retention ring receiving portions 56, 58, which perform the function of retention ring 38, but with less material. For example, retention ring 38 could be replaced by three retention ring portions that are equally spaced from each other. Once a portion of retention ring 38 is secured within one of the first and second retention ring receiving portions 56, 58, diaphragm housing 34 and adapter housing 36 can be easily press-fit together to assemble remote diaphragm assembly 10.

With retention ring 38 secured to either first or second retention ring receiving portions 56, 58, press-fitting diaphragm housing 34 and adapter housing 36 together involves forcing first cylindrical portion 66 into second cylindrical portion 70. This process causes retention ring 38 to temporarily compress between interior surface 72 and exterior surface 68 then expand to occupy retention ring cavity 62, as shown in FIGS. 5 and 6. The force required to press-fit diaphragm housing 34 and adapter housing 36 together depends, in part, upon the amount of compression retention ring 38 must undergo before being allowed to expand within retention ring cavity 62. In addition to having a dependence on the amount of compression that retention ring 38 must undergo to squeeze between interior and exterior surfaces 72, 68, the force required to disassemble diaphragm housing 34 and adapter housing 36 or break the press-fit connection also depends, in part, on the shape of first and second retention ring receiving portions 56, 58 or grooves 64. Preferably, the amount of force required to assemble and disassemble remote diaphragm assembly 10 can be exerted by hand.

The press-fit connection between diaphragm housing 34 and adapter housing 36 can be adapted to resist rotation of diaphragm housing 34 and adapter housing 36 relative to one another due to frictional resistance between exterior surface 60 of retention ring 38 and first and second retention ring receiving portions 56, 58, as shown in FIGS. 5 and 6. The amount of frictional resistance depends on the amount retention ring 38 is compressed within retention ring cavity 62 and the material used to form retention ring 38. This frictional resistance can be temporarily overcome by hand to properly align diaphragm housing 34 relative to adapter housing 36, which may be necessary when, for example, aligning a drain or vent valve (not shown) on either diaphragm housing 34 or adapter housing 36.

Figure 7:
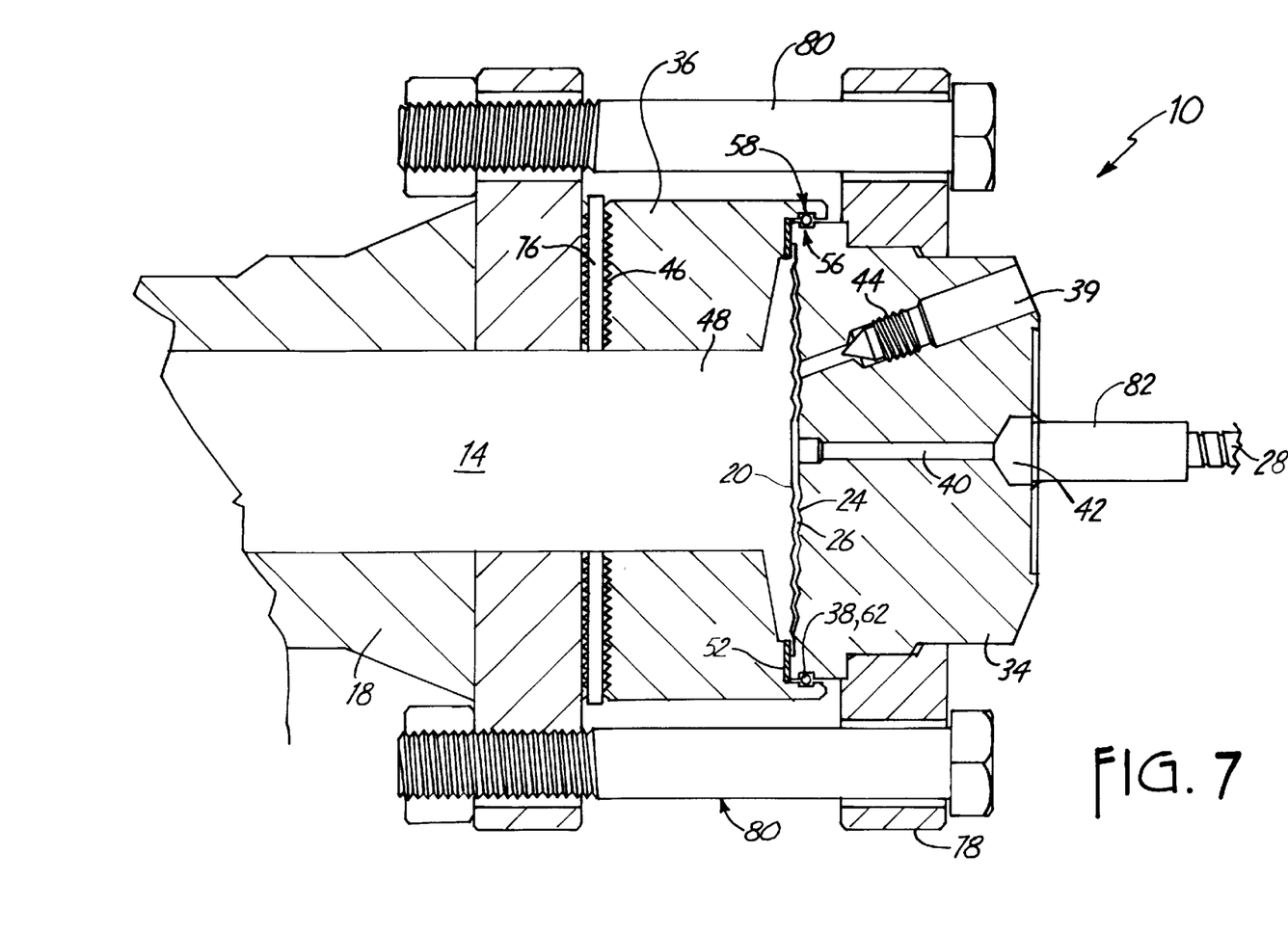
FIG. 7 is a side cross-sectional view of an installed remote diaphragm assembly in accordance with one embodiment of the invention.

Referring now to FIG. 7, the general procedure for installing the remote diaphragm assembly 10 between process flange 18 and capillary tube 28 will be discussed. As previously mentioned, one of the advantages of the present invention is the ability to quickly and easily assemble the components of remote diaphragm assembly 10 by hand to form a single unit. Thus, with retention ring 38 attached to either first or second retention ring receiving portion 56, 58, and gasket 52 positioned between diaphragm housing 34 and adapter housing 36, diaphragm housing 34 and adapter housing 36 can be press-fit together sandwiching gasket 52 therebetween. The installer can overcome the frictional resistance of the press-fit connection by hand and rotate diaphragm housing 34 and adapter housing 36 relative to each other to properly align the components of remote diaphragm assembly 10. Gasket 76 is positioned between flange interface 46 and process flange 18 to provide leakage protection at that junction. Next, collar 78 is placed over diaphragm housing 34 and nuts and bolts 80 are used to compress remote diaphragm assembly 10 and gasket 76 between collar 78 and flange 18. Finally, capillary tube 28 is attached to tube port 42, using a suitable connector 82, to establish fluid communication with cavity 26 through passageway 40. Fill fluid can be introduced to cavity 26 through fill port 39, which can be sealed using plug 44.

This installation would be more difficult if remote diaphragm assembly 10 could not be formed into a single unit or if forming remote diaphragm assembly 10 into the single unit involved using screws, clips, or other similar fasteners. The additional difficulty would stem from having to: manage several parts simultaneously; continuously monitor the alignment of several parts; perform several more steps in order to assemble or disassemble remote diaphragm assembly 10; and use tools to assemble and disassemble remote diaphragm assembly 10.

As a result, the press-fit feature of embodiments of the present invention simplifies the assembly and disassembly of remote diaphragm assembly 10, makes installation of remote diaphragm assembly 10 easier, simplifies the replacement or inspection of gasket 52, and simplifies the alignment of the components of remote diaphragm assembly 10.

Although the press-fit remote diaphragm assembly of the present invention has been described with reference to various embodiments, workers skilled in the art will recognize that changes may be made in form and detail without departing from the spirit and scope of the invention.

What is claimed is:

1. A remote diaphragm assembly configured to couple a process control instrument to a vessel containing process fluid, comprising:

a diaphragm housing including a flexible diaphragm and a first retention ring receiving portion;

an adapter housing configured to place the flexible diaphragm in fluid communication with the process fluid, the adapter housing having a second retention ring receiving portion aligned with the first retention ring receiving portion to thereby form a retention ring cavity; and a retention ring positioned within the retention ring cavity such that portions of the retention ring occupy the first and second retention ring receiving portions to couple the diaphragm housing to the adapter housing.

2. The remote diaphragm assembly of claim 1, wherein:

the diaphragm housing includes a first cylindrical portion having an exterior surface defining the first retention ring receiving portion; and the adapter housing includes a second cylindrical portion configured to receive the first cylindrical portion and having an interior surface defining the second retention ring receiving portion.

3. The remote diaphragm assembly of claim 1, wherein:

the adapter housing includes a first cylindrical portion having an exterior surface defining the second retention ring receiving portion; and the diaphragm housing includes a second cylindrical portion configured to receive the first cylindrical portion having an interior surface defining the first retention ring receiving portion.

4. The remote diaphragm assembly of claim 1, wherein the retention ring is an elastomer O-ring.

5. The remote diaphragm assembly of claim 1, wherein the retention ring is a radial spring.

6. The remote diaphragm assembly of claim 2, wherein at least one of the first and second cylindrical portions includes a guide surface adapted to assist insertion of the first cylindrical portion into the second cylindrical portion.

7. The remote diaphragm assembly of claim 3, wherein at least one of the first and second cylindrical portions includes a guide surface adapted to assist insertion of the first cylindrical portion into the second cylindrical portion.

8. The remote diaphragm assembly of claim 1, further comprising a gasket sandwiched between the vessel and the adapter housing and proximate to the flexible diaphragm.

9. A method of assembling a remote diaphragm assembly configured to couple a process control instrument to a vessel containing process fluid, comprising:

providing a diaphragm housing having a flexible diaphragm and a first retention ring receiving portion;

providing an adapter housing configured to place the diaphragm in fluid communication with the process fluid, the adapter housing having a second retention ring receiving portion;

securing a portion of a retention ring within one of the first and second retention ring receiving portions; and press-fitting the diaphragm housing and the adapter housing together whereby the retention ring temporarily compresses then expands to occupy a retention ring cavity defined by the first and second retention ring receiving portions to couple the diaphragm housing to the adapter housing.

10. The method of claim 9, wherein:

the diaphragm housing includes a first cylindrical portion having an exterior surface defining the first retention ring receiving portion;

the adapter housing includes a second cylindrical portion configured to receive the first cylindrical portion and having an interior surface defining the second retention ring receiving portion; and the step of press-fitting includes inserting the first cylindrical portion into the second cylindrical portion.

11. The method of claim 9, wherein:

the adapter housing includes a first cylindrical portion having an exterior surface defining the second retention ring receiving portion;

the diaphragm housing includes a second cylindrical portion configured to receive the first cylindrical portion having an interior surface defining the first retention ring receiving portion; and the step of press-fitting includes inserting the first cylindrical portion into the second cylindrical portion.

12. The method of claim 10, wherein at least one of the first and second cylindrical portions includes a guide surface adapted to assist the press-fitting of the diaphragm housing and the adapter housing together.

13. The method of claim 11, wherein at least one of the first and second cylindrical portions includes a guide surface adapted to assist the press-fitting of the diaphragm housing and the adapter housing together.

* * * * *